Patented Sept. 19, 1950

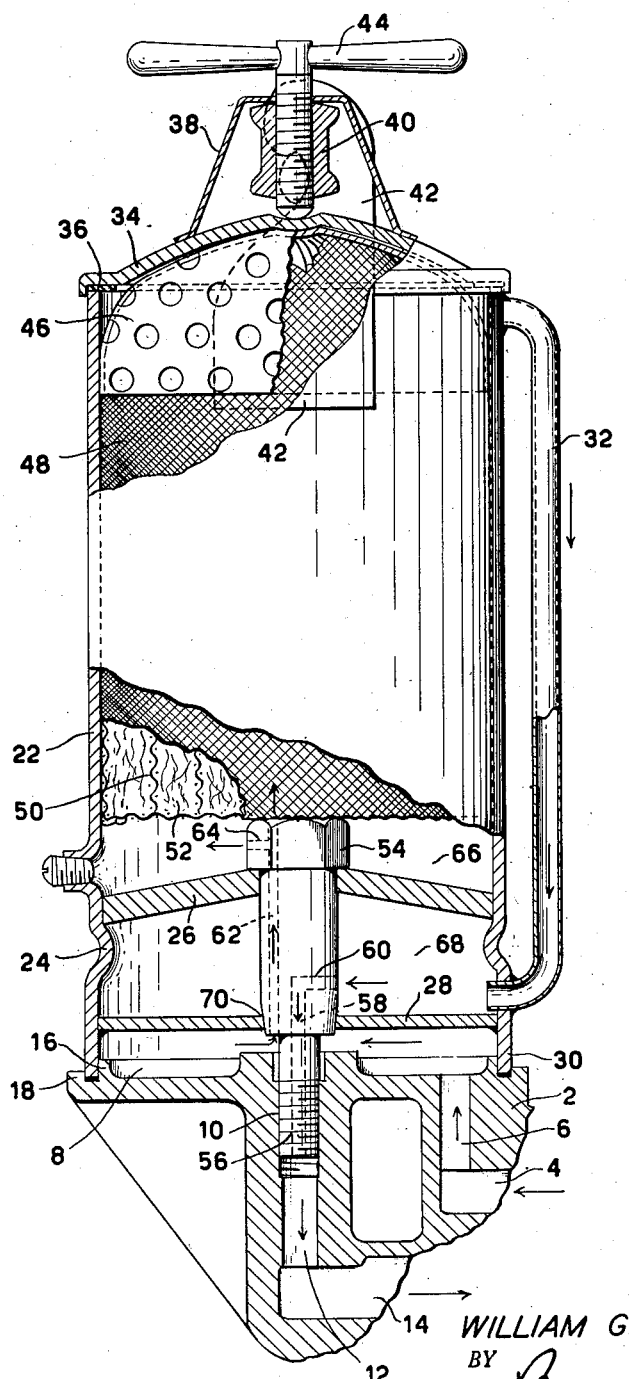

2,522,565

UNITED STATES PATENT OFFICE 2,522,565

OIL FILTER

William G. Burhans, Kingston, N. Y.

Application March 19, 1948, Serial No. 15,777

8 Claims. (Cl. 210—164)

This invention relates to an oil filter and particularly to an oil filter designed to replace a different type of oil filter in association with a mounting bracket provided as standard equipment with certain vehicle engines.

Some engines are originally provided with a bracket for the support of an oil filter of a particular type which comprises a casing including a central tube on which is mounted a filter cartridge having a central hole fitting over the tube. The arrangement is such that the oil to be filtered is introduced into the portion of the casing on the outside of this cartridge and the oil passes through the filter into the central tube flowing therefrom into a central opening in the supporting bracket. The bracket provided for this purpose has on its upper surface a circular groove concentric with the outlet opening and is provided with an eccentric opening within the groove for the introduction of oil.

A more satisfactory type of filter is illustrated in my Reissue Patent 20,494, dated September 7, 1937 and in my Patent 2,298,674, dated October 13, 1942. In this type of filter there is provided a casing having cylindrical walls within which there is located a bag-type filter cartridge which engages the cylindrical walls. In this type of filter the oil enters beneath the cartridge forcing it upwardly against a dome-shaped perforated plate and causing it to expand tightly against the cylindrical walls of the casing, the oil leaving the cartridge through the perforated plate and passing to an outlet opening. It is one object of the present invention to provide a replacement filter which will make possible the use of cartridges and the principles of operation last mentioned in conjunction with the mounting bracket discussed above.

A further object of the invention is to provide an arrangement of the type just indicated of a filter which is self-contained in the sense of requiring no special piping to complete the oil flow circuit.

These and other objects of the invention will become apparent from the following description read in conjunction with the accompanying drawing in which the figure illustrates, partly in axial section and partly in elevation, the improved replacement filter in association with a supporting bracket.

The supporting bracket referred to above is indicated generally at 2 and consists of a casting originally provided for the mounting of a filter of the type having a central oil return tube. This bracket has a lateral oil receiving opening 4 communicating with an eccentrically arranged vertical opening 6 which leads oil into the space 8 above the bracket. The bracket is provided with a central tapped opening 10 which is continued as a vertical bore 12 communicating with a lateral oil delivery opening 14. A pair of flanges 16 and 18 concentric with the central opening define a concentric groove for the reception of the skirt portion of a filter. As indicated above, the invention achieves the association with this standard bracket of a replacement filter of the type disclosed in my prior patents.

The improved filter comprises a generally cylindrical casing 22 provided with an inwardly directed bead 24 which serves for the support of a conical plate 26 having a central opening therethrough. Beneath the bead 24 there is welded into the casing a flat plate 28 provided with a central opening. The lower end of the casing terminates in a skirt portion 30 receivable in the groove between the flanges 16 and 18 with the interposition of a gasket to provide an oil-tight assembly. A tube 32 welded to the casing provides communication between the upper end of the casing and the chamber 68 provided between the plates 26 and 28.

The casing 22 is closed by a cap 34 which is similar to that described in my prior patents, this cap being sealed against the upper edge of the casing through the use of a gasket 36 and the provision of an assembly comprising a member 38, a transverse bar 40 and a screw 44 which presses downwardly on the top of the cap 34 when the ends of the bar 40 are received within the hooks of a pair of hook members 42 welded to the casing. Inside the upper end of the casing below the cap 34 there is the perforated dome member 46 against which the filter cartridge 48 is compressed when oil flow takes place, the cartridge being, at this time, also pressed tightly against the cylindrical walls of the casing 22. The filter cartridge is desirably of a type similar to one of the types disclosed in my prior patents comprising a bag of fabric including cotton waste 52 supported to resist collapse by a spirally arranged strip of a wire mesh indicated at 50. The lower end of this bag is formed with a disc-like fabric bottom and the upper end is drawn together over the cotton waste by a drawstring or draw wire arrangement. These cartridges are also provided with wire bails (not shown) by which they may be removed after they become clogged with dirt.

Assembly of the filter with the supporting bracket and the provision of proper oil passages is provided by means of a central bolt 54 which passes through the opening in the conical plate 26 and through the opening in the flat plate 28, the bolt being provided at its lower end with a reduced portion threaded as indicated at 56 for reception in the tapped opening 10 in the bracket. The bolt is provided with a central opening 58 extending from its lower end up into its enlarged shank where it communicates with a lateral opening 60 furnishing communication with the chamber 68. A longitudinally extending side bore 62 extends through the top of the bolt 54 and also through the bottom of the enlarged shank at one side of the threaded extension. Desirably a lateral passage 64 in the head of the bolt also communicates with the bore 62. The lower end of the enlarged shank of the bolt is tapered as indicated at 70 so that when the bolt is secured in position a tight fit of the shank in the opening in the plate 28 is obained.

When in condition for operation the parts described are assembled as indicated in the drawing. The bolt 54 is threaded into the tapped opening 10 and by tightening this bolt its head is engaged tightly with the conical plate 26 and its taper at 70 wedges within the opening in the plate 28 so that the chamber 68 is closed except for the passages afforded by tube 32 and the lateral opening 60. The filter cartridge is then placed in position in the casing and the cap is tightened on the casing.

Oil flow takes place into the bracket 2 through the passage 4 and then flows through the passage 6 into the space 8 below the plate 28 passing therefrom upwardly through the bore 62 and out its upper end and the lateral opening 64 into the chamber 66 beneath the cartridge. It then passes upwardly through the cartridge, undergoing filtration, and escapes through the perforations in the dome 46 into the upper end of the casing from which it flows through the tube 32 into the chamber 68 and thence through the passages 60 and 58 to the passages 12 and 14 in the bracket from which it is delivered for use.

It will be evident from the above that the filter provides, in association with the standard openings in the supporting brackets, a proper flow of the oil in normal fashion so far as the exterior connections are concerned. The filter is a complete unit in its requiring no special pipe connections to the engine, the only exterior passage 32 being permanently carried by the casing 22.

It will be clear that various modifications may be made without departing from the scope of the invention as defined in the following claims.

What I claim and desire to protect by Letters Patent is:

1. An oil filter constructed and arranged for association with a support including a tapped central oil outlet opening, an eccentric oil inlet opening, and an annular seat, said filter comprising a generally cylindrical casing having a lower skirt portion engageable with said annular seat, a lower plate tightly engaging the interior walls of said casing and provided with a central opening, a second plate above the lower plate and spaced therefrom and also engaging the interior walls of said casing and provided with a central opening, a cap for said casing, a member below said cap limiting upward movement of a filter cartridge located within the casing above said second plate and providing a filtered oil receiving chamber above the cartridge, means passing outside of said casing providing a conduit between said chamber and the space between said plates, and a bolt arranged for location through the central openings in said plates, to be threaded into said tapped central oil outlet opening and to bear upon said second plate thereby securing said casing to said support, said bolt having a passage therein connecting said oil outlet opening with the space between said plates and having a second passage connecting a space below the lower plate with the space above the second plate.

2. An oil filter constructed and arranged for association with a support including a tapped central oil outlet opening, an eccentric oil inlet opening, and an annular seat, said filter comprising a generally cylindrical casing having a lower skirt portion engageable with said annular seat, a lower plate tightly engaging the interior walls of said casing and provided with a central opening, a second plate above the lower plate and spaced therefrom and also engaging the interior walls of said casing and provided with a central opening, a cap for said casing, a member below said cap limiting upward movement of a filter cartridge located within the casing above said second plate and providing a filtered oil receiving chamber above the cartridge, means comprising an external tube permanently connected with the casing providing a conduit between said chamber and the space between said plates, and a bolt arranged for location through the central openings in said plates, to be threaded into said tapped central oil outlet opening and to bear upon said second plate thereby securing said casing to said support, said bolt having a passage therein connecting said oil outlet opening with the space between said plates and having a second passage connecting a space below the lower plate with the space above the second plate.

3. An oil filter constructed and arranged for association with a support including a tapped central oil outlet opening, an eccentric oil inlet opening, and an annular seat, said filter comprising a generally cylindrical casing having a lower skirt portion engageable with said annular seat, a lower plate tightly engaging the interior walls of said casing and provided with a central opening, a second plate above the lower plate and spaced therefrom and also engaging the interior walls of said casing and provided with a central opening, a cap for said casing, a member below said cap limiting upward movement of a filter cartridge located within the casing above said second plate and providing a filtered oil receiving chamber above the cartridge, means passing outside of said casing providing a conduit between said chamber and the space between said plates, and a bolt arranged for location through the central openings in said plates in substantially oil tight relation with the plates, to be threaded into said tapped central oil outlet opening and to bear upon said second plate thereby securing said casing to said support, said bolt having a passage therein connecting said oil outlet opening with the space between said plates and having a second passage connecting a space below the lower plate with the space above the second plate.

4. An oil filter comprising a generally cylindrical casing, a pair of spaced transverse partitions in the lower part of said casing providing a space in the casing below the lower of the partitions, a space between the partitions, and a space above the upper partition for reception of a filter cartridge, means passing outside of said casing providing an oil passage between the upper portion of the space above the upper partition and the space between the partitions, means providing an oil passage between the lower portion of the space above the upper partition and the space below the lower partition, and means providing an exterior connection with the space between the partitions.

5. An oil filter comprising a generally cylindrical casing, a pair of spaced transverse partitions in the lower part of said casing providing a space in the casing below the lower of the partitions, a space between the partitions, and a space above the upper partition for reception of a filter cartridge, means comprising an external tube permanently connected with said casing providing an oil passage between the upper portion of the space above the upper partition and the space between the partitions, means providing an oil passage between the lower portion of the space above the upper partition and the space below the lower partition, and means providing an exterior central connection with the space between the partitions.

6. An oil filter comprising a generally cylindrical casing, a pair of spaced transverse partitions in the lower part of said casing providing a space in the casing below the lower of the partitions, a space between the partitions, and a space above the upper partition for reception of a filter cartridge, means passing outside of said casing providing an oil passage between the upper portion of the space above the upper partition and the space between the partitions, means providing an eccentric oil passage between the lower portion of the space above the upper partition and the space below the lower partition, and means providing an exterior connection with the space between the partitions.

7. An oil filter constructed and arranged for association with a support including a tapped central oil outlet opening, an eccentric oil inlet opening, and an annular seat, said filter comprising a generally cylindrical casing having a lower skirt portion engageable with said annular seat, partition means permanently engaging the interior walls of said casing, a central passage and a radial passage within said partition means, a cap for said casing, a member below said cap limiting the upward movement of a replaceable filter cartridge located within said casing above said partition means and providing a filtered oil receiving chamber above the cartridge, means passing outside of the casing providing a conduit between said chamber and said radial passage, a bolt arranged for location through the central passage in said partition means to be threaded into said tapped central oil outlet opening and to bear upon said partition means thereby securing said casing to said support, a passage connecting the space below said partition means with the space above said partition means, and a passage in said bolt connecting said central oil outlet opening with said radial passage in said partition means.

8. An oil filter constructed and arranged for association with a support including a tapped central oil outlet opening, an eccentric oil inlet opening, and an annular seat, said filter comprising a generally cylindrical casing having a lower skirt portion engageable with said annular seat, partition means permanently engaging the interior walls of said casing, a central passage and a radial passage within said partition means, a cap for said casing, a member below said cap limiting the upward movement of a replaceable filter cartridge located within said casing above said partition means and providing a filtered oil receiving chamber above the cartridge, means comprising an external tube permanently connected with said casing providing a conduit between said chamber and said radial passage, a bolt arranged for location through the central passage in said partition means to be threaded into said tapped central oil outlet opening and to bear upon said partition means thereby securing said casing to said support, a passage connecting the space below said partition means with the space above said partition means, and a passage in said bolt connecting said central oil outlet opening with said radial passage in said partition means.

WILLIAM G. BURHANS.

REFERENCES CITED

The following references are of record in the file of this patent:

UNITED STATES PATENTS

| Number | Name | Date |
|---|---|---|
| Re. 20,494 | Burhans | Sept. 7, 1937 |
| 2,073,442 | Briggs | Mar. 9, 1937 |
| 2,076,934 | Burckhalter | Apr. 13, 1937 |
| 2,197,252 | Decker | Apr. 16, 1940 |
| 2,253,684 | Burckhalter | Aug. 26, 1941 |
| 2,253,685 | Burckhalter | Aug. 26, 1941 |
| 2,298,674 | Burhans | Oct. 13, 1942 |